United States Patent [19]

Kuno et al.

[11] 4,435,760
[45] * Mar. 6, 1984

[54] RUNNING POSITION INDICATOR APPARATUS

[75] Inventors: Akira Kuno, Oobu; Muneaki Matsumoto, Okazaki; Koji Numata, Toyokawa; Susumu Urano, Oobu, all of Japan

[73] Assignees: Nippon Soken, Inc., Nishio; Nippondenso Co., Ltd., Kariya, both of Japan

[*] Notice: The portion of the term of this patent subsequent to Jan. 4, 2000 has been disclaimed.

[21] Appl. No.: 231,441

[22] Filed: Feb. 4, 1981

[30] Foreign Application Priority Data

Feb. 8, 1980 [JP] Japan .................................. 55-15172

[51] Int. Cl.³ ........................ G06F 15/50; G09B 29/10
[52] U.S. Cl. .................................. 364/444; 364/424; 364/436; 340/988
[58] Field of Search ............... 364/443, 444, 449, 424, 364/460, 559, 561, 436; 340/23, 24, 27 NA; 235/92 DN

[56] References Cited

U.S. PATENT DOCUMENTS

| | | | |
|---|---|---|---|
| 3,059,233 | 10/1962 | Guarino et al. | 340/27 NA |
| 3,577,120 | 5/1971 | Sherbert, Jr. | 340/27 NA |
| 3,789,198 | 1/1974 | Henson et al. | 340/24 |
| 4,139,889 | 2/1979 | Ingels | 364/424 |
| 4,145,605 | 3/1979 | Marcus | 364/460 |
| 4,182,171 | 1/1980 | Looker | 340/27 NA |
| 4,234,924 | 11/1980 | La Vance et al. | 364/449 |
| 4,244,514 | 1/1981 | Nomura et al. | 235/92 DN |
| 4,312,041 | 1/1982 | DeJonge | 340/27 NA |
| 4,367,453 | 1/1983 | Kuno et al. | 364/436 |

*Primary Examiner*—Gary Chin
*Attorney, Agent, or Firm*—Cushman, Darby & Cushman

[57] ABSTRACT

An automobile running position indicator apparatus which comprises a device for generating a unit coverage distance signal each time the automobile has covered a unit distance, a device for generating a direction signal representing the automobile running direction at each time and a device for generating set signals representing the distance and direction from the starting point to the destination. A vectorical length from the starting point to the destination is operated from the set signals. The distance covered by the automobile is accumulated for each direction from the distance signal and the direction signal thereby to calculate a vectorial value length from the starting point to the present position. These vectorial values are used to determine a vectorial length from the present position to the destination, and the resulting vectorial direction and distance are displayed in the same display section.

9 Claims, 8 Drawing Figures

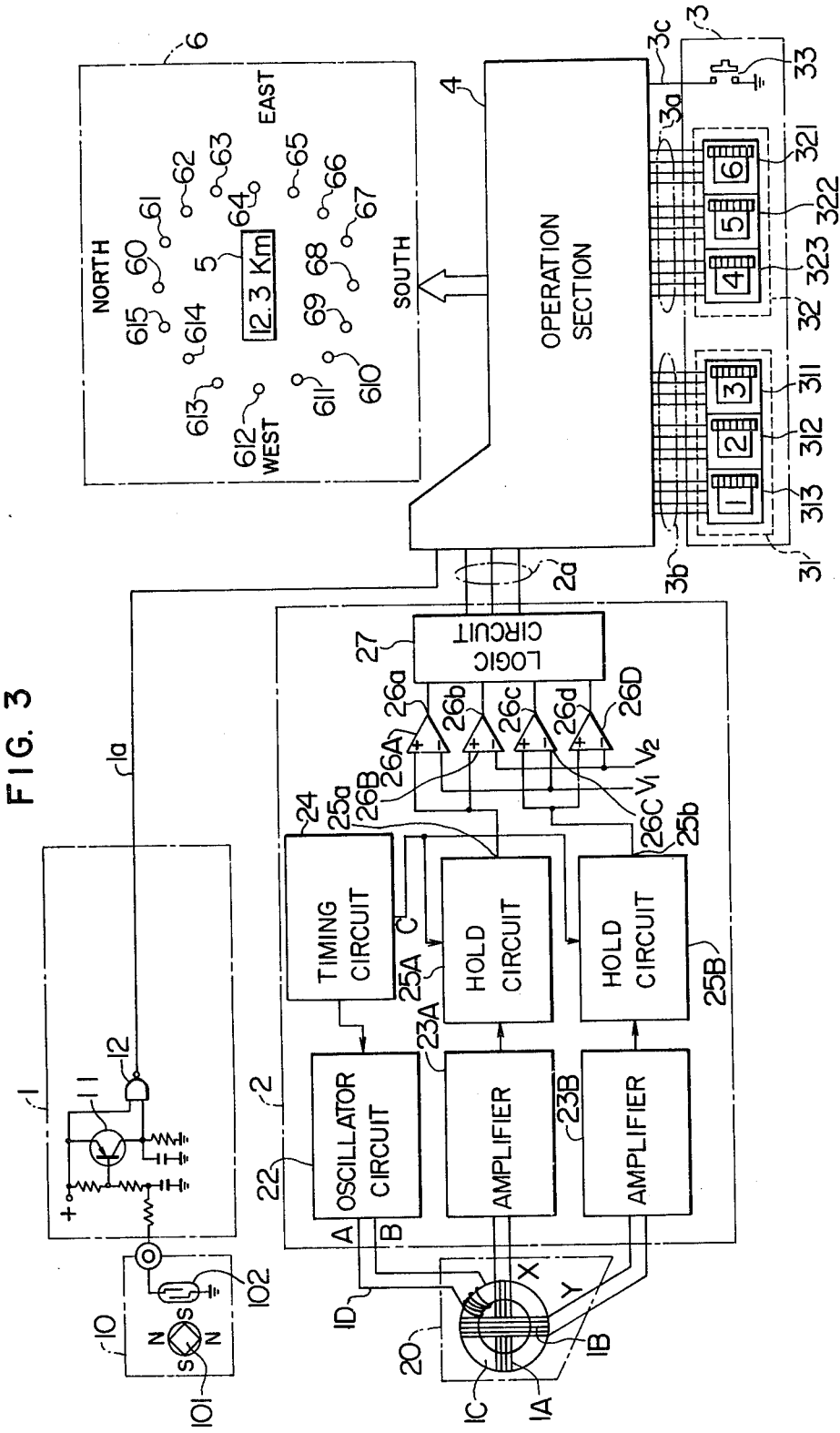

RUNNING POSITION INDICATOR APPARATUS

BACKGROUND OF THE INVENTION

1. Field of the Invention

The present invention relates to a running position indicating apparatus for providing a running automobile with selected data on the direction and the distance to a destination.

2. Description of the Prior Art

In conventional methods, a point of place where an automobile is running may be determined from a road sign or by referring to a map. It is very troublesome for a driver to determine a given point of place by this method, and it is substantially impossible for him to determine a given point while driving an automobile.

The running position indicator apparatus according to the present invention has been developed in view of these facts and comprises distance detector means for generating a distance signal associated with the distance covered by the automobile, direction detector means for generating a direction signal associated with the direction in which the automobile is running, destination setting means for generating set signals corresponding to the distance to the destination and the direction to be followed, which are set at the starting point, operation means for determining a running position between the starting point and the destination on the basis of the distance signal from the distance detector means, the direction signal from the direction detector means and the set signals from the destination setting means, the operation means producing data on the distance to the destination and the direction thereof from the running position, thus generating an indication signal corresponding to the data on distance and direction at predetermined intervals of distance or time, and indicator means for indicating the data on the distance to the destination and the direction thereof in the same indication section on the basis of the indication signal from the operation means. In this way, the running position indicator apparatus according to the present invention determines the positional relation between the destination, and the currently running point of place.

SUMMARY OF THE INVENTION

According to the present invention, there is provided a running position indicator apparatus comprising means for setting the direction of and the distance to a predetermined destination, means for determining the data on the direction of and the distance to the destination from the presently running position while the automobile is running, means for generating an indication signal corresponding to the data, and means for indicating in the same indication section the data on the distance to and the direction of the destination in response to the indication signal. In this way, the present position of the automobile as related to the destination is easily recognized on the one hand and by generating the indication signal at predetermined intervals of distance or time, it is possible to prevent undesirable flickering on the other hand. Further, this invention has a great advantage in that by indicating the data on the direction of and the distance to the destination in the same indication section, the distance and direction data are understood at a glance.

BRIEF DESCRIPTION OF THE DRAWINGS

FIG. 3 is a diagram of electric connections showing the configuration of FIG. 1 in detail.

DESCRIPTION OF THE PREFERRED EMBODIMENTS

Figure 1:
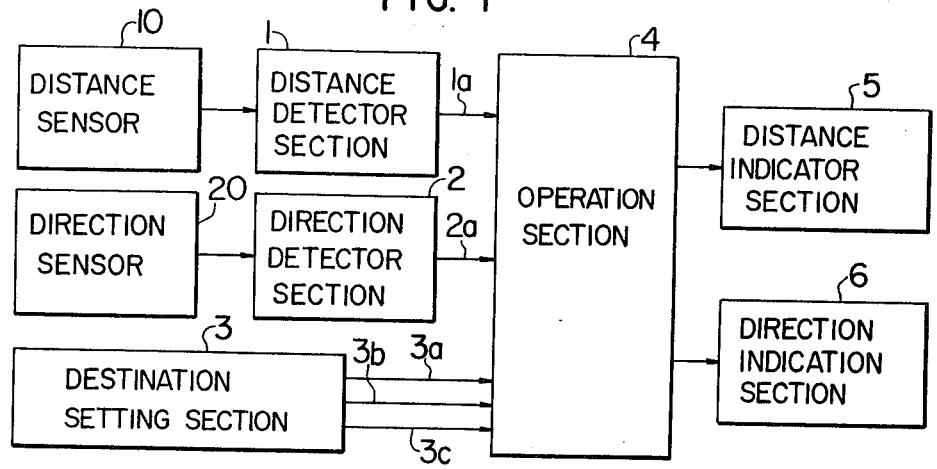
FIG. 1 is a block diagram schematically showing a general configuration of an embodiment of the present invention.
Figure 2:
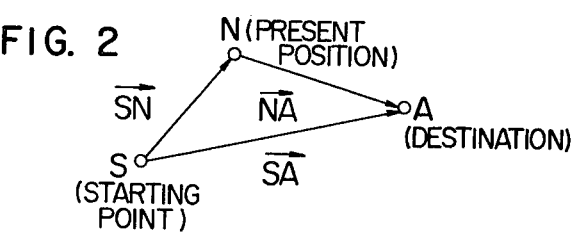
FIG. 2 is a vectorial diagram for explaining the operation according to the present invention.

Embodiments of the present invention will now be explained with reference to the accompanying drawings. FIG. 1 is a diagram schematically showing a general configuration of an embodiment of the present invention. In this drawing, reference numeral 1 shows a distance detecting section, which in response to a signal from a distance sensor 10 for generating a pulse at regular intervals of distance coverage, detects the distance covered by the automobile and produces a unit distance signal at a terminal 1a. This distance detecting section together with the distance sensor 10 makes up distance detector means. Numeral 2 shows a direction detecting section which, in response to a signal associated with the automobile running direction from a direction sensor 20, produces at a terminal 2a a signal corresponding to the running direction of the automobile after sensing and classifying the running direction. This direction detection section 2 and the direction sensor 20 make up direction detector means. Numeral 3 shows a destination setting section or destination setting means which, in relation to the distance to and the direction of a destination set at the starting point, generates a destination distance signal at a terminal 3a and a destination direction signal at a terminal 3b. Numeral 4 shows an operation section or operation means which, in response to the unit covered distance signal, the direction signal, the distination distance signal and the destination direction signal, constantly calculates the vector S→N of the current position N to which the automobile has run from the starting point S as shown in the vector diagram of FIG. 2, and calculates on the basis of the destination distance signal and the destination direction signal set at the destination setting section 3, namely, the vectors S→A of the destination A from the starting point S shown in FIG. 2 (S→A−S→N), thus calculating the vector N→A of the destination from the present position N. The distance of this vector N→A is displayed at the distance indicator section 5, and the direction at the direction indicator section 6. The distance indicator section 5 and the direction indicator section 6 make up indicator means.

Next, a detailed circuit embodying the above-mentioned blocks will be described with reference to FIG. 3. In this drawing, the distance sensor 10 includes a rotating member 101 made of a magnet operatively interlocked with a driving shaft or a wheel, and a reed switch 102 opened or closed in accordance with the N or S polarity of the rotating member 101. This distance sensor 10 produces a signal pulse equivalent to 1/2550 km. The distance detector section 1 includes a transistor 11, a resistor, a capacitor and a waveform shaping gate 12 for producing a unit coveraged distance signal pulse equivalent to 1/2550 km.

Figure 4:
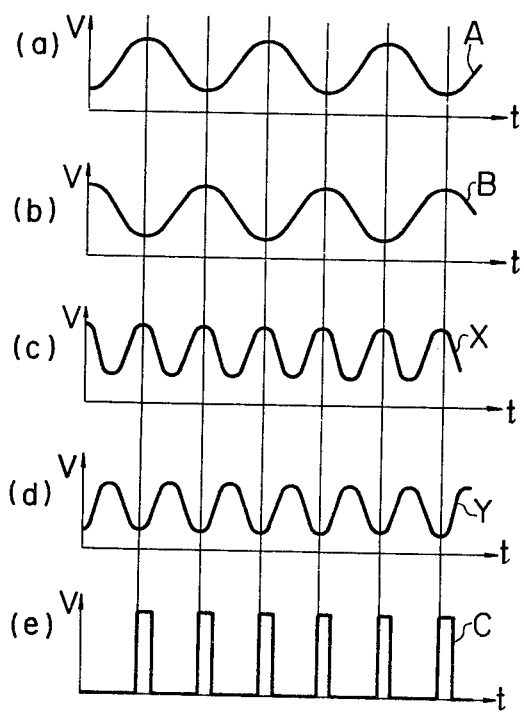
FIG. 4 shows voltage waveforms for explaining the operation of a direction detector section.
Figure 5:
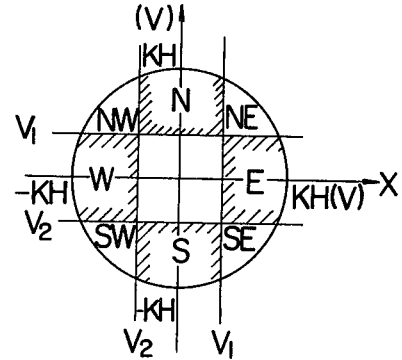
FIG. 5 shows the operating principle of the invention for explaining the operation of the apparatus according to the present invention.

The operation of the direction sensor 20 and the direction detector section 2 will be described with reference to FIGS. 4 and 5. In FIG. 3, the direction sensor 20 comprises a core 1c of ferromagnetic material wound with an exciting coil 1D and output coils 1A and 1B at right angles to each other. Numeral 22 shows an oscillator circuit. In order for the exciting winding 1D to oscillate at the frequency f, the magnetic field in the magnetic core 10 for producing symmetric AC signals A and B (FIGS. 4(a) and 4(b)) changes in accordance with the intensity H of the horizontal component force of the earth magnetism, so that outputs X and Y (FIGS. 4(c) and 4(d)) proportionate to this change are produced at the output windings 1A and 1B respectively. The outputs X and Y of the output windings 1A and 1B change with the direction of the direction sensor 20, namely, the running direction of the automobile. Thus the outputs X and Y are amplified to the same maximum value through amplifier circuits 23A and 24B respectively and sample held by holding circuits 25A and 25B respectively by the signal C from the timing circuit 24 (FIG. 4(e)), with the result that the output voltages at the points designated by 25a and 25b respectively change in proportion to the outputs X and Y of the direction sensor 20. When the direction sensor 20 is rotated by 360 degrees, the loci of the outputs traced by points 25a and 25b forms a circle of a magnitude proportional to the intensity H of the horizontal component force of the earth magnetism as shown in FIG. 5 (radius kH (volt), k being a constant). In the case of eight directional divisions, one division corresponds to 45 degrees, and therefore reference voltages $V_1$ and $V_2$ are given as $$V_1 = k \sin 22.5° \approx 0.3827\, k \text{ (volts)}$$

$$V_2 = k \sin 22.5° \approx -0.3827\, k \text{ (volts)}.$$

In this way, the amplified signals from the output windings 1A and 1B are divided into three signal levels respectively. The comparators 26A and 26B (Motorola's MC3302P) in FIG. 3 compare the output of the holding circuit 25A with the reference voltages $V_1$ and $V_2$ respectively, and the comparators 26C and 26D compare the output signals of the holding circuit 25B with the reference voltages $V_1$ and $V_2$ respectively. As a result, the relation between the comparator outputs at the points 26a, 26b and 26c and the running direction of the automobile is primarily expressed as below.

|   |   | Y |   |   |   |
|---|---|---|---|---|---|
|   | 26c | 0 | 0 | 1 | 1 |
| X |   |   | 26d |   |   |
| 26a | 26b | 0 | 1 | 0 | 1 |
| 0 | 0 | SW | W |   | NW |
| 0 | 1 | S |   |   | N |
| 1 | 0 |   |   |   |   |
| 1 | 1 | SE | E |   | NE |

In the case where the comparator outputs at 26a and 26b are both "1", the output at point 26c is "0" and the output at point 26d is "1", for instance, the car is running eastward, i.e., in the direction of "E". The outputs of the comparators 26A, 26B, 26C and 26D are applied to the logic circuit 27 so that the direction in which the automobile is running is divided into eight parts and a direction signal in the form of binary code is produced at the output 2a of the direction detector section 2.

The destination setting section 3 comprises a direction setting section 31, a distance setting section 32 and a set switch 33. The direction setting section 31 and the distance setting section 32 produce a destination direction signal and a destination distance signal representing the angle of the direction toward the destination from the starting point in the form of BCD code by manual operation. These signals are produced at terminals 3a and 3b respectively. In the embodiment under consideration, the setting sections 31 and 32 have rotary digital switches 311, 312, 313; and 321, 322, 323 respectively for indication of a three-digit set value. The set switch 33 is operated when the above-mentioned value is set at the starting point and produces a set signal at the terminal 3c.

Figure 6A:
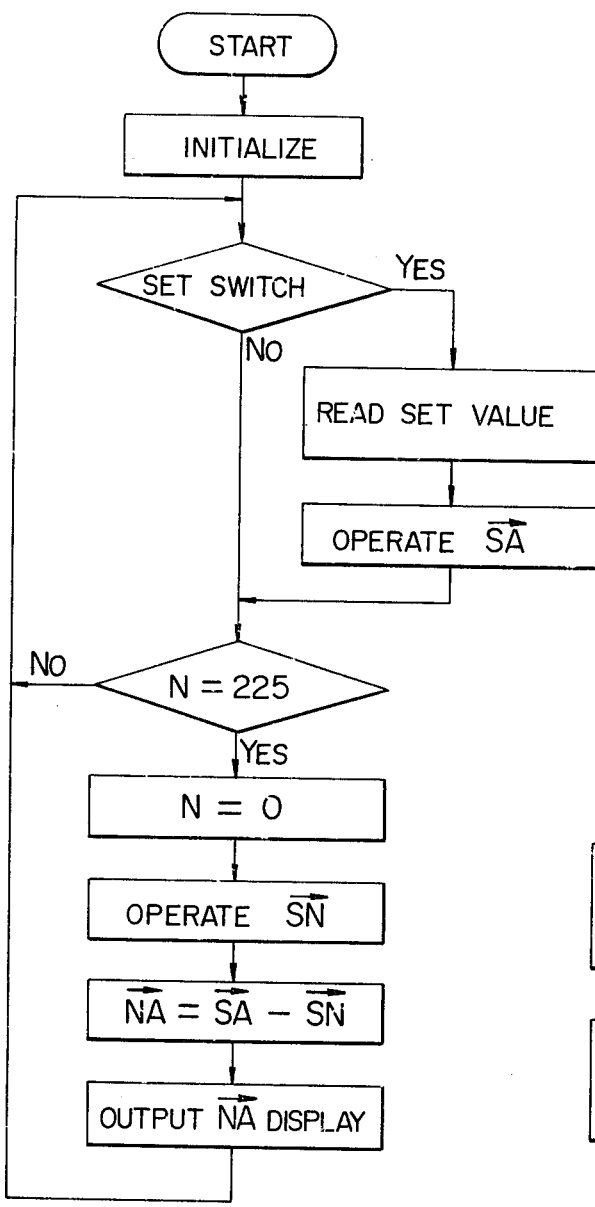
FIGS. 6a and 6b are operation flowcharts showing processes of operation of the operation means according to the present invention.
Figure 6B:
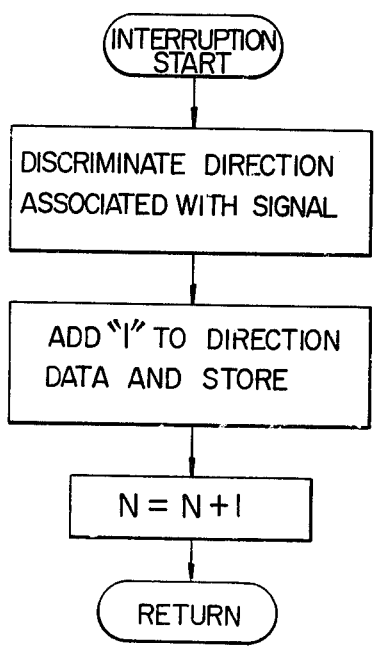

The operation section 4 includes a well-known microcomputer system for carrying out the operation as shown in FIGS. 6a and 6b. First, in the main routine shown in FIG. 6a, the vectorial value S→A (FIG. 2) from the starting point S to the destination A is calculated in advance at the time of generation of the set signal from the destination setting section 3. Each time of generation of the unit coverage distance signal from the distance detector section 1, an interruption and calculation as shown in FIG. 6b are carried out so that a value of the direction signal from the direction detector section 2 is additionally stored in a memory. Turning to the main routine, each time the distance coverage reaches 100 m, the vectorial values S→N (FIG. 2) of the present position N from the starting point S is operated from the accumulated value of the distance based on each direction obtained thus far. Then the vectors S→A and S→N are used to operate the vector value N→A from the present point N to the destination A by the subtraction N→A = S→A − S→N. The vector N→A is divided into direction and distance and indicated in the direction indicator section 6 and the distance indicator section 5 respectively.

As shown in FIG. 3, the direction indicator section 6 comprises 16 light-emitting diodes 60 to 615 arranged along a circumference, so that the direction obtained from the operation section 4 is indicated by lighting the related one of the lamps. The distance indicator section 5 indicates the distance obtained from the calculator section 4 in the form of digital value of three digits at the center of the display lamps 60 to 615 of the direction indicator section 6.

Although the above-mentioned embodiment involves eight directional divisions in the direction detector section 2, it is obvious that the more the direction divisions, the values obtained from the calculator section 4 are indicated more accurately on the direction indicator section 6 and the distance indicator section 5 respectively. A set of 16, 32 or 360 divisions are alternatives.

As described above, the direction setting section 31 of the destination setting section 3 sets the direction by angle. Instead of this method, symbols such as "northeast" or "south by southwest" may be set and encoded to be applied to the operation section 4.

Figure 7:
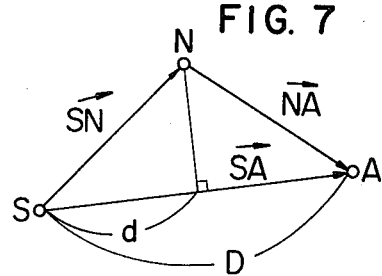
FIG. 7 is a vectorial diagram for explaining the operation according to an embodiment of the present invention.

Also, it is possible to determine the ratio between the value d representing a conversion of the distance from the starting point S to the present position N into an equivalent distance along the line from the starting point to the destination A and the linear distance D from the starting point S to the destination A as shown in the vectorical diagram of FIG. 7. Thus this ratio is calculated from $d/D \times 100$ (%) at the operation section 4. In this case, a bar graph or a circular graph may be used instead of the numeral indication.

Further, the above-described embodiment is such that the vectorial value $N \rightarrow A$ from the present position N to the destination A is operated at the operation section 4 at intervals of coverage of 100 m and an associated indication signal is produced. As an alternative to this method, by use of a timer, a vectorial value $N \rightarrow A$ may be operated and an indication signal may be produced at a regular interval of time. As another alternative, the operation of the vector $N \rightarrow A$ may be made all the time and a corresponding indication signal is produced at predetermined intervals of distance or time.

We claim:

1. A running position indicator apparatus comprising:
   distance detector means for generating a distance signal representing the distance covered by an automobile;
   direction detector means for generating a direction signal representing the running direction of the automobile;
   destination setting means for generating a destination direction signal representing the angle of the direction from the starting point to the destination and a destination distance signal representing the linear distance from the starting point to the destination;
   operation means for calculating the vectorial value from the starting point to the destination in response to said destination direction signal and said destination distance signal, calculating the vectorial value from the starting point to the present position from said distance signal and said direction signal, subtracting the vectorial value from the starting point to the present position from the vectorial value from the starting point to the destination thereby to determine a vectorial value from the present position to the destination, and producing a signal representing the direction from the present position to the destination and a signal representing a linear distance from the present position to the destination; and
   indicator means for indicating data on the linear distance from the present position to the destination and data on the direction from the present position to the destination in the same indication section in response to the output signal from said operation means.

2. A running position indicator apparatus according to claim 1, wherein said indicator means includes a direction indicator section for indicating the direction by a plurality of display elements annularly arranged, and a distance indicator section arranged within said annular indicator elements for indicating data on distance.

3. A running position indicator apparatus according to claim 2, wherein said direction indicator section has symbols representing directions including east, west, south, north around said annularly-arranged indicator elements, said indicator elements being arranged for respective directions.

4. A running position indicator apparatus according to claim 2 or 3, wherein said indicator elements annularly arranged are light-emitting elements.

5. A running position indicator apparatus according to claim 2, wherein said distance indicator section includes display elements for indicating a numerical value of distance.

6. A running position indicator apparatus according to claim 2, wherein said distance indicator section includes an indicator element for indicating the ratio d/D wherein d is the value of distance in the direction to the destination converted from the linear distance from the starting point to the present position and D is the whole distance from the starting point to the destination.

7. Apparatus as in claim 1, wherein said distance detector means includes a distance sensor for generating a pulse signal in synchronism with the rotation of the wheels of the automobile; and a distance detector section for generating, in response to said pulse signal, a unit coverage distance signal representing the fact that the automobile has run said unit distance.

8. Apparatus as in claim 1, wherein said direction detector means includes a direction sensor mounted on said automobile for generating a signal proportional to the intensity of the horizontal component of the earth magnetism changing with the change of the direction in which the automobile is running; and direction detector means for generating a direction signal representing the direction of the running of the automobile in response to an output signal from said direction sensor.

9. Apparatus as in claim 1, wherein said destination setting means includes a direction setting means for manually setting the direction and a distance setting means for manually setting the distance.

* * * * *